United States Patent
Venkatraman et al.

(10) Patent No.: US 11,252,074 B2
(45) Date of Patent: Feb. 15, 2022

(54) DETECTION OF MULTIHOMING MISCONFIGURATION

(71) Applicant: Juniper Networks, Inc., Sunnyvale, CA (US)

(72) Inventors: Vasudevan Venkatraman, Bangalore (IN); Sushant Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 2 days.

(21) Appl. No.: 16/829,595

(22) Filed: Mar. 25, 2020

(65) Prior Publication Data

US 2021/0306250 A1    Sep. 30, 2021

(51) Int. Cl.
| | |
|---|---|
| *H04L 12/715* | (2013.01) |
| *H04L 12/46* | (2006.01) |
| *H04L 12/26* | (2006.01) |
| *H04L 12/709* | (2013.01) |
| *H04L 29/08* | (2006.01) |

(52) U.S. Cl.
CPC .......... *H04L 45/04* (2013.01); *H04L 12/4641* (2013.01); *H04L 43/106* (2013.01); *H04L 45/245* (2013.01); *H04L 67/147* (2013.01)

(58) Field of Classification Search
CPC ... H04L 45/04; H04L 12/4641; H04L 43/106; H04L 45/245; H04L 67/147; H04L 45/124; H04L 45/24; H04L 45/123; H04W 40/02

See application file for complete search history.

(56) References Cited

U.S. PATENT DOCUMENTS

| 7,099,284 | B2 * | 8/2006 | Halme ................... H04L 43/00 370/253 |
| 2013/0315097 | A1 | 11/2013 | Yang et al. |
| 2013/0315255 | A1 | 11/2013 | Mullooly et al. |
| 2018/0217833 | A1 * | 8/2018 | Teisberg ............... H04L 41/082 |
| 2018/0309596 | A1 * | 10/2018 | Brissette ............. H04L 12/4679 |
| 2018/0367400 | A1 | 12/2018 | Pani et al. |
| 2019/0230025 | A1 * | 7/2019 | Kommula ........... H04L 41/0893 |
| 2020/0021523 | A1 * | 1/2020 | Wang .................. H04L 12/4641 |
| 2020/0236065 | A1 * | 7/2020 | Kommula ............... H04L 49/15 |
| 2020/0313968 | A1 * | 10/2020 | Pani ...................... H04L 43/045 |
| 2021/0075666 | A1 * | 3/2021 | Subagio .................. H04L 12/44 |

OTHER PUBLICATIONS

Extended European Search Report for Application No. EP20175124.5, dated Aug. 19, 2020, 11 pages.
Sajassi, et al., "BGP MPLS-Based Ethernet VPN," Feb. 2015, 56 pages.

* cited by examiner

*Primary Examiner* — Kibrom T Hailu
(74) *Attorney, Agent, or Firm* — Harrity & Harrity, LLP

(57) ABSTRACT

A network device may receive, from an endpoint device, a first message that includes first endpoint identification information. The network device may be connected to the endpoint device via a plurality of links. The network device may receive, from another network device, a second message that includes second endpoint identification information. The network device may determine whether the first endpoint identification information corresponds to the second endpoint identification information. The network device may cause, based on determining whether the first endpoint identification information corresponds to the second endpoint identification information, a state of the plurality of links to be maintained or changed.

20 Claims, 12 Drawing Sheets

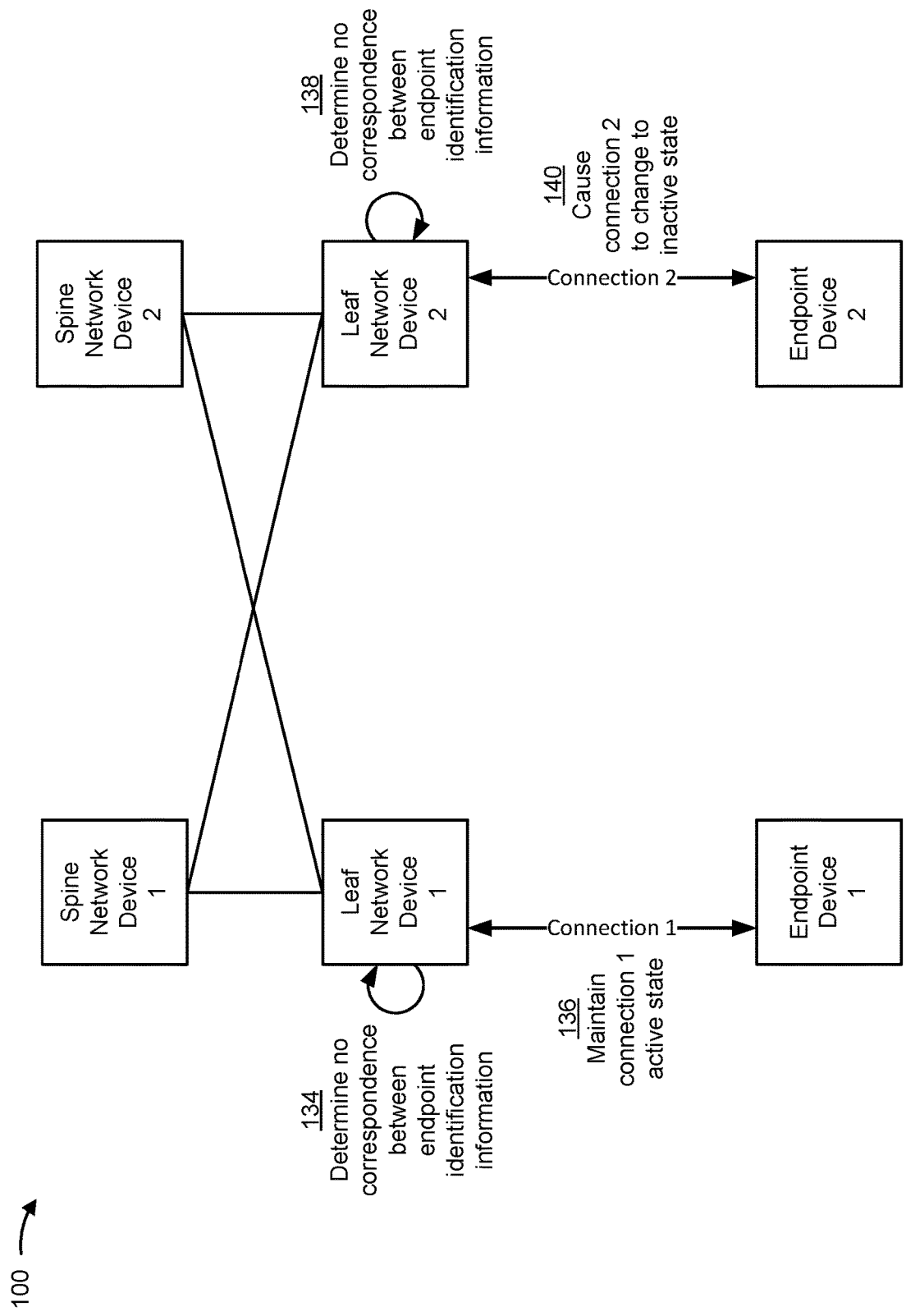

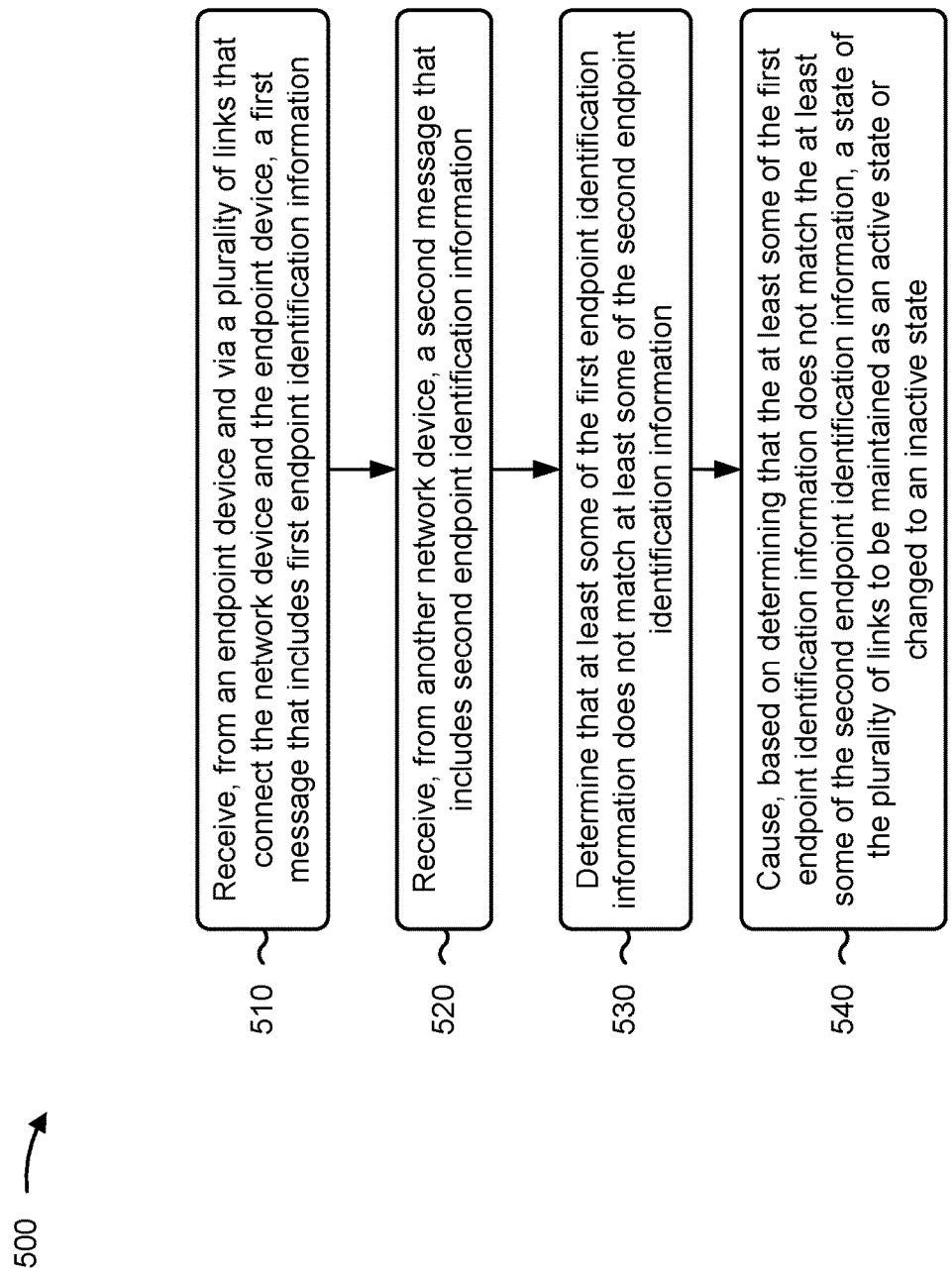

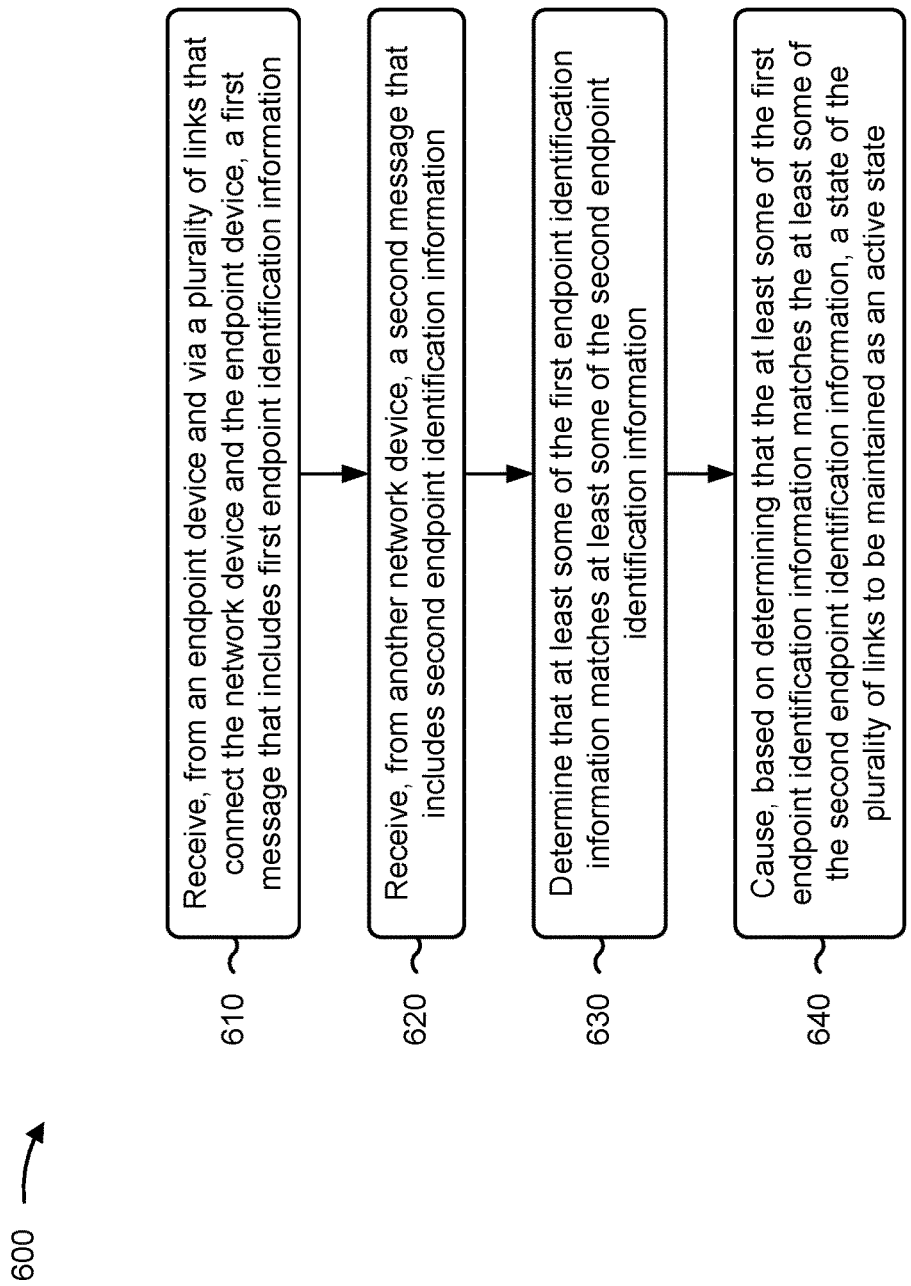

DETECTION OF MULTIHOMING MISCONFIGURATION

BACKGROUND

A spine and leaf topology of network devices is a multi-layer data center network topology that includes leaf network devices (e.g., to which servers and storage devices connect) and spine network devices (e.g., to which leaf network devices connect). The leaf network devices may mesh into a spine to form an access layer that delivers network connection points for servers.

SUMMARY

According to some implementations, a method may include receiving, by a network device and from an endpoint device, a first message that includes first endpoint identification information, wherein the network device is connected to the endpoint device via a plurality of links; receiving, by the network device and from another network device, a second message that includes second endpoint identification information; determining, by the network device, whether the first endpoint identification information corresponds to the second endpoint identification information; and causing, by the network device and based on determining whether the first endpoint identification information corresponds to the second endpoint identification information, a state of the plurality of links to be maintained or changed.

According to some implementations, a network device may include one or more memories and one or more processors. The one or more processors may be configured to: receive, from an endpoint device and via a plurality of links that connect the network device and the endpoint device, a first message that includes first endpoint identification information, receive, from another network device, a second message that includes second endpoint identification information; determine that at least some of the first endpoint identification information does not match at least some of the second endpoint identification information; and cause, based on determining that the at least some of the first endpoint identification information does not match the at least some of the second endpoint identification information, a state of the plurality of links to be maintained as an active state or changed to an inactive state.

According to some implementations, a non-transitory computer-readable medium may store one or more instructions. The one or more instructions, when executed by one or more processors of a network device, may cause the one or more processors to: receive, from an endpoint device and via a plurality of links that connect the network device and the endpoint device, a first message that includes first endpoint identification information, receive, from another network device, a second message that includes second endpoint identification information; determine that at least some of the first endpoint identification information matches at least some of the second endpoint identification information; and cause, based on determining that the at least some of the first endpoint identification information matches the at least some of the second endpoint identification information, a state of the plurality of links to be maintained as an active state.

BRIEF DESCRIPTION OF THE DRAWINGS

FIGS. 1A-1F are diagrams of one or more example implementations described herein.

FIGS. 4-6 are flowcharts of example processes for detecting an occurrence of a multihoming misconfiguration.

DETAILED DESCRIPTION

Figure 1A:
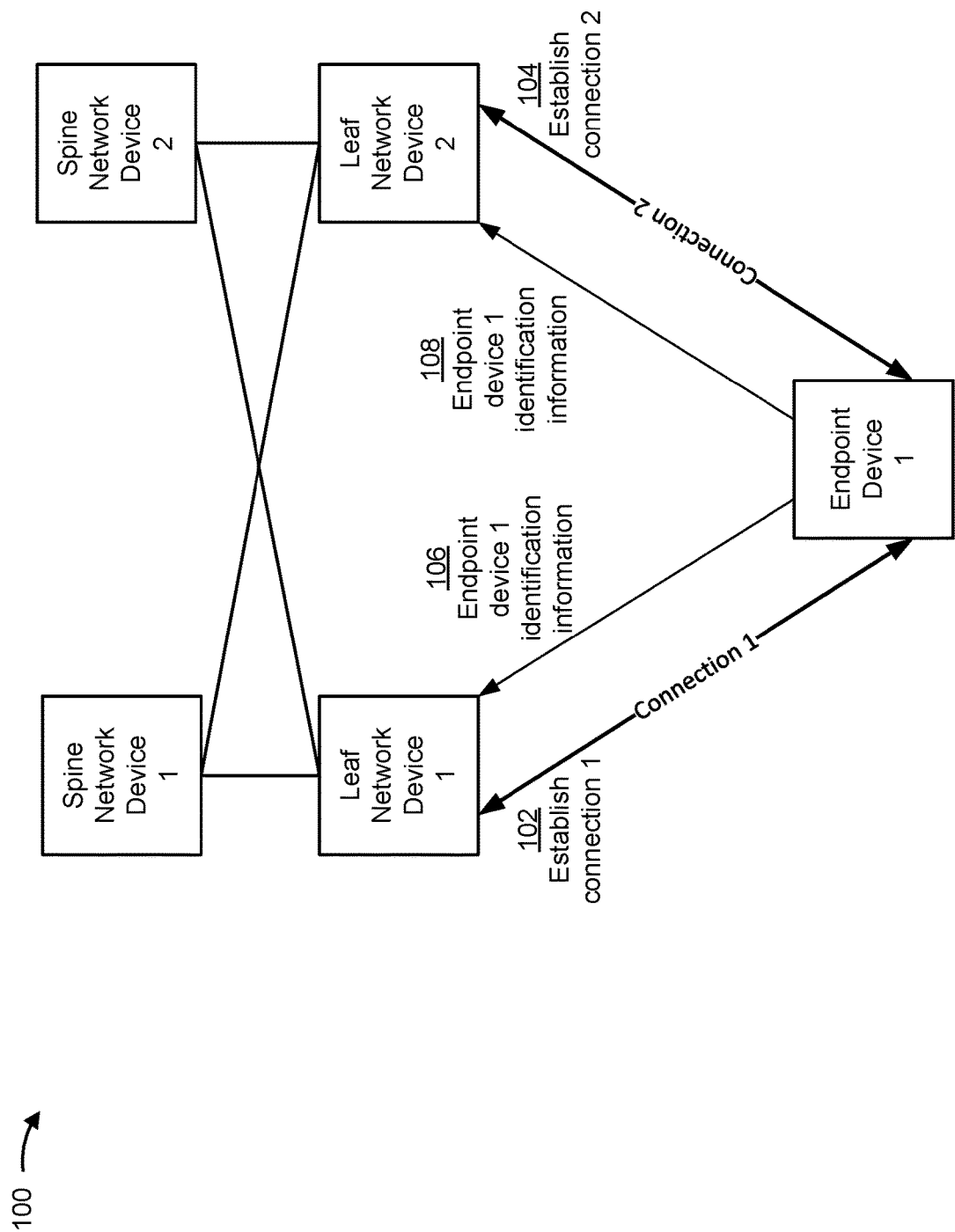

The following detailed description of example implementations refers to the accompanying drawings. The same reference numbers in different drawings may identify the same or similar elements.

A data center may include a plurality of network devices configured in a spine and leaf network topology. The spine and leaf network topology may include a leaf layer and a spine layer. The leaf layer may include leaf network devices (e.g., routers, gateways, bridges, switches, network interface controllers (NICs), and/or the like) that connect to endpoint devices (e.g., servers, firewalls, edge devices, and/or the like). The spine layer may include spine network devices (e.g., routers, gateways, bridges, switches, network interface controllers (NICs), and/or the like) that form the backbone of the network. Every leaf network device may be interconnected with each and every spine network device.

An endpoint device may be connected to one or more leaf network devices. In a multihoming scenario, an endpoint device is connected to two or more leaf network devices to increase throughput and/or to provide redundancy. Each of the leaf network devices, to which an endpoint device is multihomed, may be configured to transmit data to and from the endpoint device via a physical connection between the leaf network device and the endpoint device.

In practice, the data center may include large numbers of devices (e.g., endpoint devices, leaf network devices, and/or spine network devices) and, in some cases, the large numbers of devices may lead to an occurrence of a multihoming misconfiguration. A multihoming misconfiguration may occur a leaf network device is configured to be multihomed with one endpoint device, but is physically connected to a different endpoint device. A multihoming misconfiguration may cause the leaf network device to incorrectly route traffic to and/or from the endpoint device to which the leaf network device is connected. Incorrectly routing the traffic may result in additional computing resources (e.g., processing resources, memory resources, communication resources, and/or the like) being utilized to process, receive, and/or re-transmit the incorrectly routed traffic.

According to some implementations described herein, a network device detects a multihoming misconfiguration when the network device is configured to be multihomed with a particular endpoint device but is actually physically connected to a different endpoint device. In some implementations, the network device may be connected to an endpoint device via a plurality of links. The network device may receive a first message that includes first endpoint identification information from the endpoint device. The network device may receive a second message that includes second endpoint identification information from another network device. The network device may determine whether the first endpoint identification information corresponds to the second endpoint identification information. The network device may cause a state of the plurality of links connecting the network device to the endpoint device to change based on whether the first endpoint identification information corresponds to the second endpoint identification information. For example, the network device may cause the plurality of links to change from an active state (e.g., used to transmit data to/from the endpoint device) to an inactive state (e.g., not used to transmit data to/from the endpoint device). In this way, the network device prevents traffic to and/or from the endpoint device from being misrouted by detecting instances when the network device is configured to be connected to a particular endpoint device but is physically connected to a different endpoint device. Preventing traffic to and/or from the endpoint device from being misrouted may conserve computing resources (e.g., processing resources, memory resources, communication resources, and/or the like) that would have otherwise been used to receive, process, and/or re-transmit misrouted traffic.

FIGS. 1A-1F are diagrams of one or more example implementations 100 described herein. As shown in FIGS. 1A-1F, an endpoint device (e.g., a server, a firewall, an edge device, and/or the like) may communicate and/or exchange traffic with a spine and leaf network topology of network devices. The spine and leaf network topology may include multiple network devices (e.g., routers, gateways, bridges, switches, network interface controllers (NIC), and/or the like), such as a first leaf network device (e.g., leaf network device 1), a second leaf network device (e.g., leaf network device 2), a first spine network device (e.g., spine network device 1), a second spine network device (e.g., spine network device 2), and/or the like. The four network devices shown in FIGS. 1A-1F are provided merely as examples of network devices, and, in practice, the spine and leaf network topology may include additional network devices.

The spine network devices may be network devices that connect one or more leaf network devices. A spine network device may connect to one or more core network devices, one or more network devices outside of the spine and leaf network topology, and/or the like. The leaf network devices may be network devices that connect to endpoint devices (e.g., the leaf network devices may be IP reachable).

A leaf network device may be physically connected with each spine network device (or a plurality of spine network devices) and may be physically connected to an endpoint device. For example, as shown in FIG. 1A, and by reference numbers 102 and 104, a connection is established between leaf network device 1 and endpoint device 1 (e.g., connection 1) and between leaf network device 2 and endpoint device 1. In some implementations, the connections are established during a deployment of a data center. For example, during a deployment of a data center, endpoint device 1 may be connected to leaf network device 1 and/or leaf network device 2 via a physical connection such as an Ethernet cable, a fiber optic cable, and/or the like.

In some implementations, leaf network device 1 and/or leaf network device 2 are connected to endpoint device 1 via a plurality of links. In some implementations, the plurality of links connecting endpoint device 1 and leaf network device 1 and/or the plurality of links connecting endpoint device 1 and leaf network device 2 comprise a link aggregation group (LAG).

In some implementations, connection 1 and/or connection 2 includes a plurality of Ethernet links constituting an Ethernet segment. The Ethernet segment included in connection 1 and/or the Ethernet segment included in connection 2 may be associated with an Ethernet segment identifier (ESI).

In some implementations, leaf network device 1 and leaf network device 2 are multihomed with endpoint device 1. For example, leaf network device 1 and leaf network device 2 may be configured to have the same network identifier and the Ethernet segment included in connection 1 and the Ethernet segment included in connection 2 may be associated with the same ESI.

As shown in FIG. 1A, and by reference number 106, leaf network device 1 receives endpoint device 1 identification information from endpoint device 1 based on connection 1 being established. The endpoint device 1 identification information may include information identifying a device identifier (e.g., a server ID, a media access control (MAC) address, and/or the like) associated with endpoint device 1. For example, leaf network device 1 may receive a message that includes a link aggregation control protocol (LACP) protocol data unit (PDU) from endpoint device 1. The LACP PDU may include information identifying the device identifier associated with endpoint device 1.

As shown in FIG. 1A, and by reference number 108, leaf network device 2 receives the endpoint device 1 identification information from endpoint device 1 based on connection 2 being established. For example, leaf network device 2 may receive a message that includes an LACP PDU from endpoint device 1. The LACP PDU may include information identifying the device identifier associated with endpoint device 1.

Figure 1B:
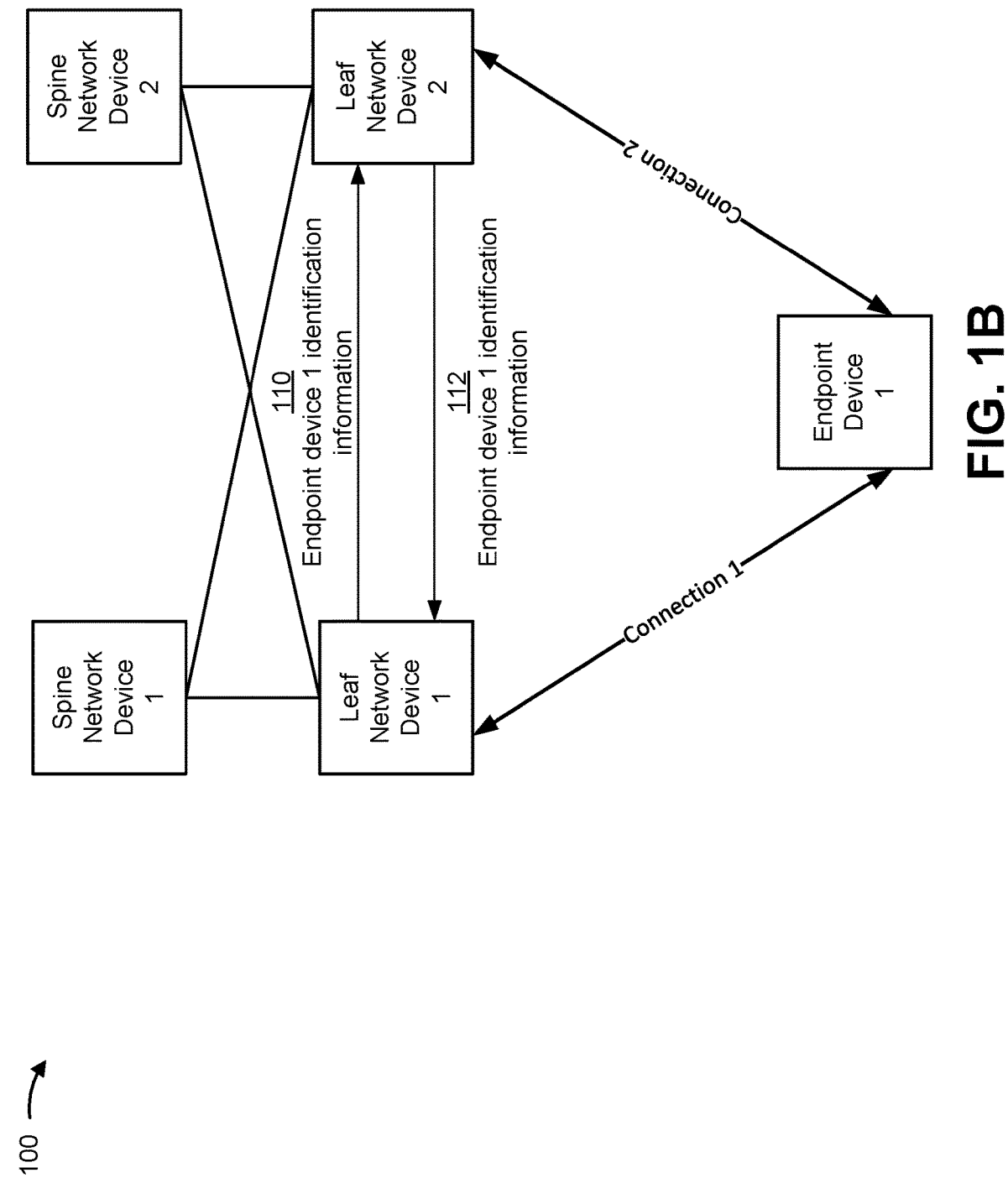

As shown in FIG. 1B, and by reference number 110, leaf network device 1 transmits the endpoint device 1 identification information to leaf network device 2. For example, leaf network device 1 may access a data structure storing information identifying network identifiers associated with leaf network devices. Leaf network device 1 may determine that leaf network device 1 and leaf network device 2 are associated with the same network identifier based on the information stored in the data structure. Leaf network device 1 may transmit the endpoint device 1 information to leaf network device 2 based on leaf network device 1 and leaf network device 2 being associated with the same network identifier.

In some implementations, leaf network device 1 transmits the endpoint device 1 identification information via a direct connection. For example, leaf network device 1 may be directly connected to leaf network device 2 via a wired connection associated with an underlay network, a backhaul network, and/or the like.

In some implementations, leaf network device 1 and leaf network device 2 are connected via at least one Ethernet virtual private network (EVPN) link and leaf network device 1 transmits the endpoint device 1 identification information to leaf network device 2 via the EVPN link. In some implementations, leaf network device 1 transmits a border gateway protocol (BGP) EVPN route message to leaf network device 2. The BGP-EVPN route message may include the endpoint device 1 identification information and information identifying the ESI associated with connection 1. In some implementations, leaf network device 1 transmits an Ethernet segment route message that includes the endpoint device 1 identification information to leaf network device 2.

In some implementations, leaf network device 1 transmits the endpoint device 1 identification information to leaf network device 2 via an indirect connection. For example, leaf network device 1 may transmit the endpoint device 1 identification information to leaf network device 2 via one or more network devices (e.g., spine network device 1 and/or spine network device 2).

As shown in FIG. 1B, and by reference number 112, leaf network device 2 transmits the endpoint device 1 identification information received from endpoint device 1 to leaf network device 1. For example, leaf network device 2 may transmit the endpoint device 1 identification information to leaf network device 1 based on leaf network device 2 and leaf network device 1 being associated with the same network identifier. In some implementations, leaf network device 2 may transmit the endpoint device 1 identification information to leaf network device 1 in a manner similar to that described above with respect to leaf network device 1 transmitting the endpoint device 1 identification information to leaf network device 2.

Figure 1C:
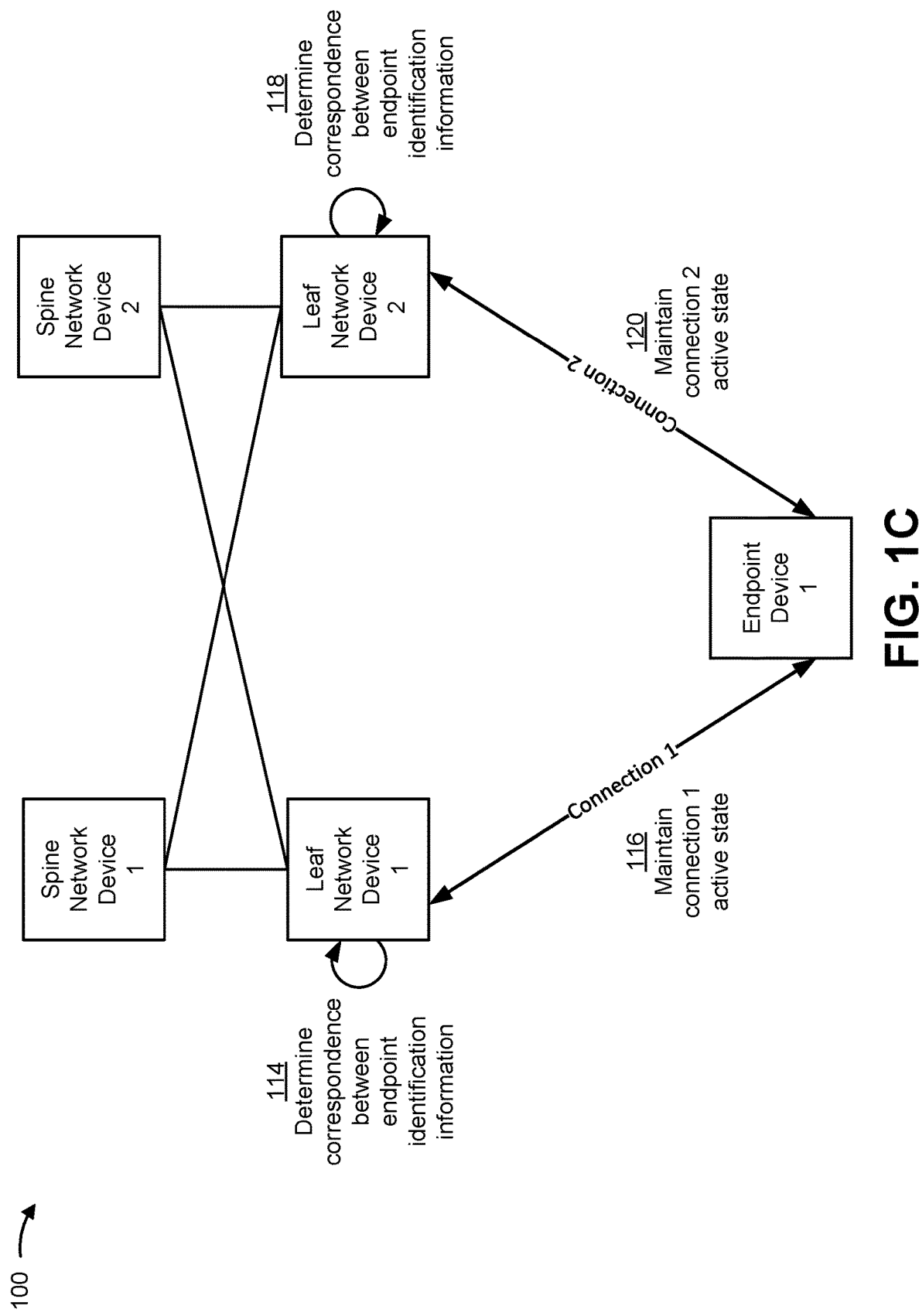

As shown in FIG. 1C, and by reference number 114, leaf network device 1 determines that a multihoming misconfiguration has not occurred based on the endpoint device 1 identification information received from endpoint device 1 and the endpoint device 1 identification information received from leaf network device 2. For example, leaf network device 1 may determine that the endpoint device 1 identification information received from endpoint device 1 corresponds to the endpoint device 1 identification information received from leaf network device 2.

In some implementations, leaf network device 1 may determine that the endpoint device 1 identification information received from endpoint device 1 corresponds to the endpoint device 1 identification information received from leaf network device 2 based on at least a portion of the endpoint device 1 identification information received from endpoint device 1 matching at least a portion of the endpoint device 1 identification information received from leaf network device 2. For example, leaf network device 1 may determine that a device identifier, an ESI, a network identifier, and/or the like included in the endpoint device 1 identification information received from endpoint device 1 matches a device identifier, an ESI, a network identifier, and/or the like included in the endpoint device 1 identification information received from leaf network device 2.

In some implementations, leaf network device 1 may cause a data structure to include a data structure element that indicates that the endpoint device 1 identification information received from endpoint device 1 corresponds to the endpoint device 1 identification information received from leaf network device 2. For example, leaf network device 1 may cause an LACP state machine to store an element indicating that leaf network device 1 and leaf network device 2 are physically connected to endpoint device 1 and/or that leaf network device 1 and leaf network device 2 are associated with the same ESI.

As shown in FIG. 1C, and by reference number 116, leaf network device 1 maintains connection 1 in an active state based on determining that the endpoint device 1 identification information received from endpoint device 1 corresponds to the endpoint device 1 identification information received from leaf network device 2 (e.g., that a multihoming misconfiguration has not occurred). For example, leaf network device 1 may maintain connection 1 in an active state by sending one or more messages to endpoint device 1 via connection 1 based on a schedule, by causing endpoint device 1 to send messages to leaf network device 1 via connection 1 based on a schedule, by causing endpoint device 1 to send messages to leaf network device 1 via connection 1 based on adjusting a timeout interval associated with connection 1, by storing information indicating the active state in a data structure, and/or the like.

As shown in FIG. 1C, and by reference number 118, leaf network device 2 may determine that a multihoming misconfiguration has not occurred. For example, leaf network device 2 may determine that the endpoint device 1 identification information received from endpoint device 1 corresponds to the endpoint device 1 identification information received from leaf network device 1. In some implementations, leaf network device 2 may determine that the endpoint device 1 identification information received from endpoint device 1 corresponds to the endpoint device 1 identification information received from leaf network device 1 in a manner similar to that described above with respect to leaf network device 1 determining that the endpoint device 1 identification information received from endpoint device 1 corresponds to the endpoint device 1 identification information received from leaf network device 2.

As shown in FIG. 1C, and by reference number 120, leaf network device 2 maintains connection 2 in an active state based on determining that the endpoint device 1 identification information received from endpoint device 1 corresponds to the endpoint device 1 identification information received from leaf network device 1. For example, leaf network device 2 may maintain connection 2 in an active state in a manner similar to that described above with respect to leaf network device 1 maintaining connection 1 in an active state.

Figure 1D:
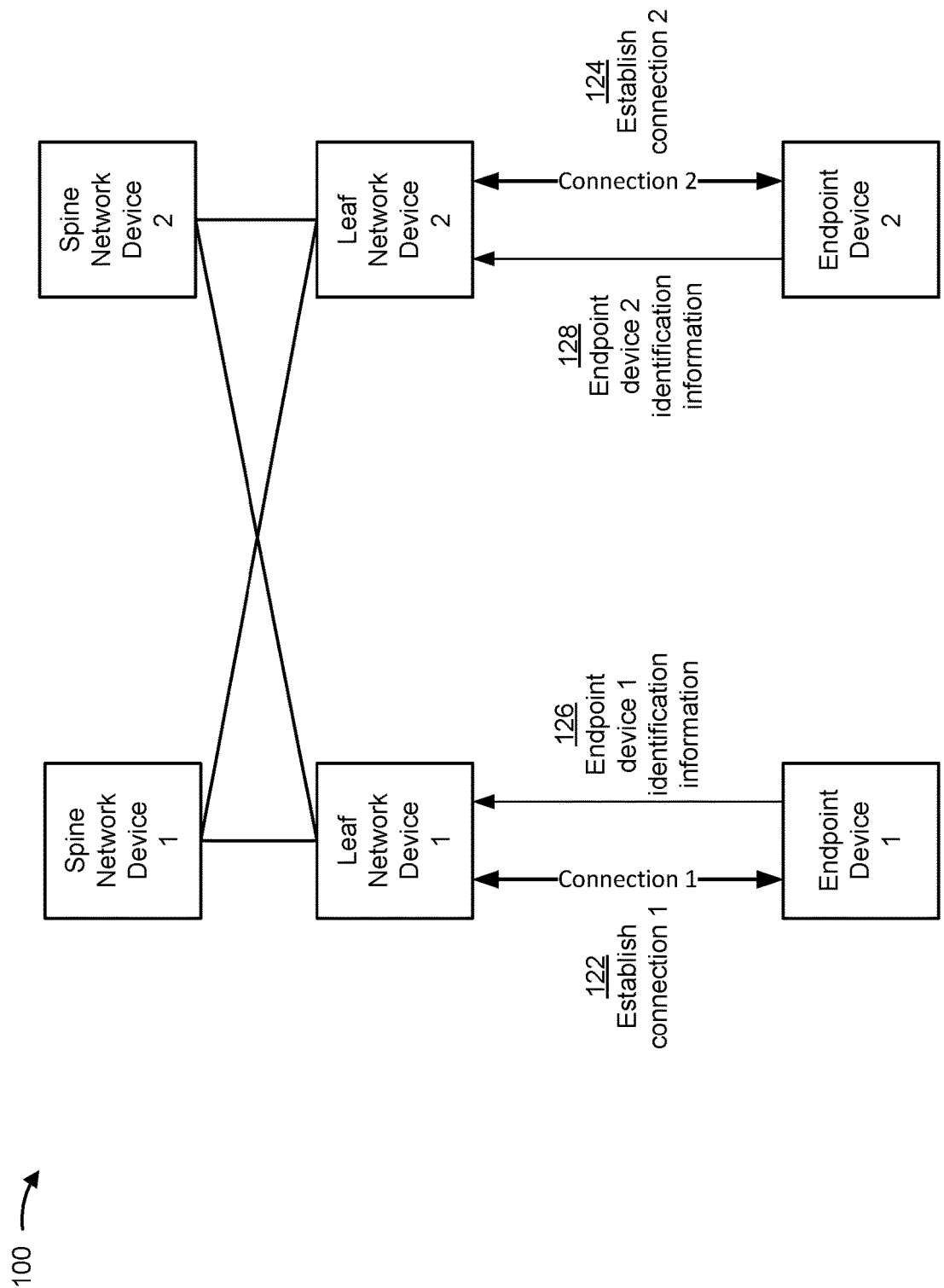
Figure 1E:
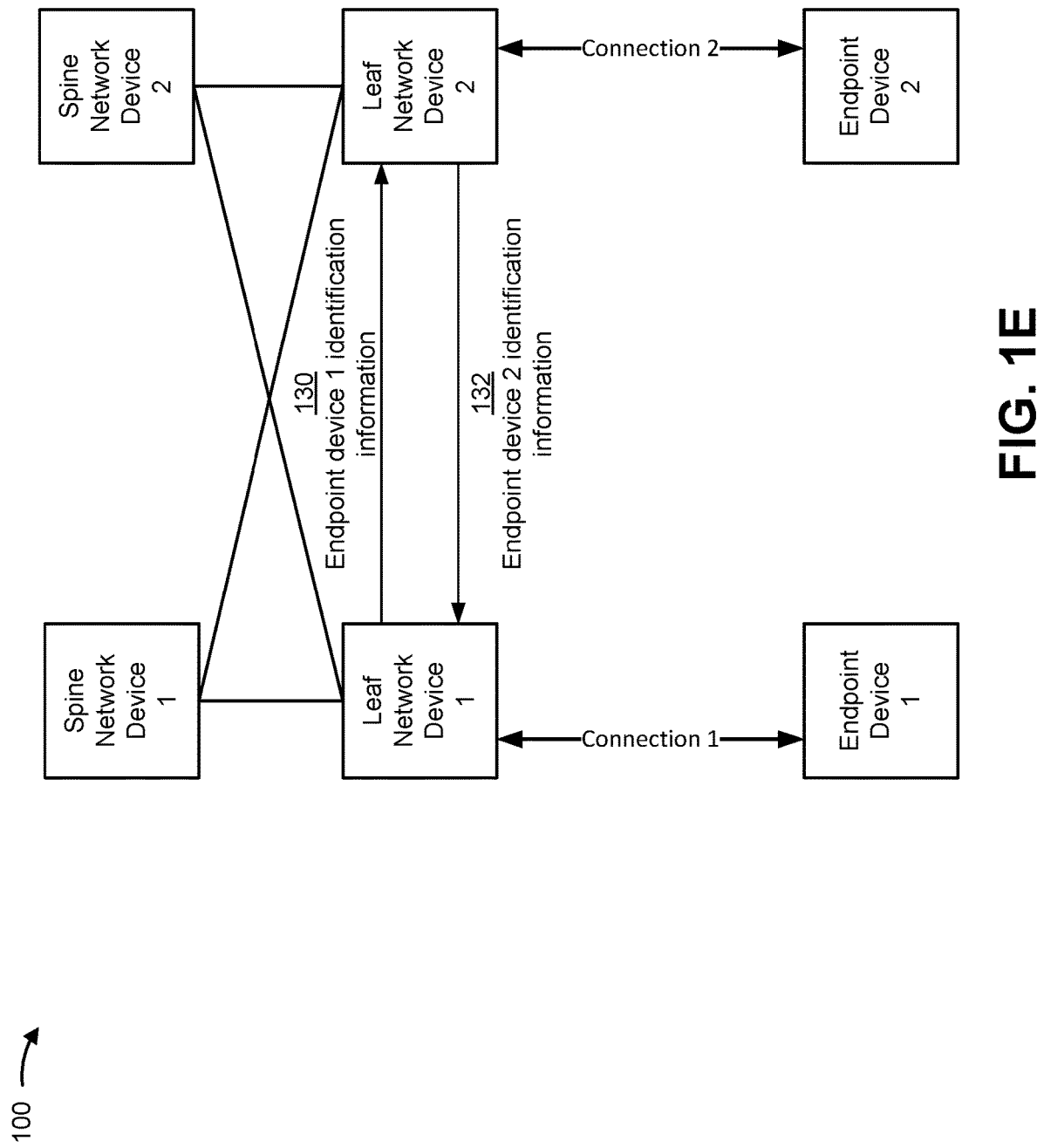

FIGS. 1D-1F are diagrams of another example of a multihoming misconfiguration. As shown in FIGS. 1D-1F, and as explained below, a multihoming misconfiguration has occurred with respect to leaf network device 2.

As shown in FIG. 1D, and by reference number 122, a connection is established between leaf network device 1 and endpoint device 1 (shown as Connection 1). For example, during deployment of a data center, leaf network device 1 may be connected to endpoint device 1 via a physical communication link such as an Ethernet cable, a fiber optic cable, and/or the like. In some implementations, connection 1 includes a plurality of links. In some implementations, the plurality of links may comprise a LAG.

In some implementations, connection 1 includes a plurality of Ethernet links constituting an Ethernet segment. The Ethernet segment may be associated with an Ethernet segment identifier (ESI).

As shown in FIG. 1C, and by reference number 124, a connection is established between leaf network device 2 and endpoint device 2 (shown as Connection 2). For example, during deployment of the data center, leaf network device 2 may be connected to endpoint device 2 via a physical communication link such as an Ethernet cable, a fiber optic cable, and/or the like. In some implementations, connection 2 includes a plurality of links. In some implementations, the plurality of links may comprise a LAG.

For the example of FIGS. 1D-1F, assume that leaf network device 1 and leaf network device 2 are configured to be multihomed with endpoint device 1. For example, leaf network device 1 and leaf network device 2 may be configured to have the same network identifier and the Ethernet segment included in connection 1 and the Ethernet segment included in connection 2 may be associated with the same ESI.

As shown in FIG. 1D, and by reference number 126, leaf network device 1 receives endpoint device 1 identification information from endpoint device 1. For example, leaf network device 1 may receive the endpoint device 1 identification information in a manner similar to that described above with respect to FIG. 1A.

As shown in FIG. 1D, and by reference number 128, leaf network device 2 receives endpoint device 2 identification information from endpoint device 2. For example, leaf network device 2 may receive the endpoint device 2 identification information in a manner similar to that described above with respect to FIG. 1A.

As shown in FIG. 1E, and by reference number 130, leaf network device 1 transmits the endpoint device 1 identification information to leaf network device 2. For example, leaf network device 1 may transmit the endpoint device 1 identification information to leaf network device 2 based on leaf network device 1 and leaf network device 2 being associated with the same network identifier. In some implementations, leaf network device 1 may transmit the endpoint device 1 identification information to leaf network device 2 in a manner similar to that described above with respect to FIG. 1B.

As shown in FIG. 1E, and by reference number 132, leaf network device 2 transmits the endpoint device 2 identification information to leaf network device 1. For example, leaf network device 2 may transmit the endpoint device 2 identification information to leaf network device 1 based on leaf network device 2 and leaf network device 1 being associated with the same network identifier. In some implementations, leaf network device 2 may transmit the endpoint device 2 identification information to leaf network device 1 in a manner similar to that described above with respect to FIG. 1B.

As shown in FIG. 1F, and by reference number 134, leaf network device 1 determines an occurrence of a multihoming misconfiguration based on the endpoint device 1 identification information and the endpoint device 2 identification information. For example, leaf network device 1 may determine that the endpoint device 1 identification information does not correspond to the endpoint device 2 identification.

In some implementations, leaf network device 1 may determine that the endpoint device 1 identification information does not correspond to the endpoint device 2 identification information received from leaf network device 2 based on at least a portion of the endpoint device 1 identification information being different from at least a portion of the endpoint device 2 identification information. For example, leaf network device 1 may determine that a device identifier included in the endpoint device 1 identification information does not match a device identifier included in the endpoint device 2 identification information.

In some implementations, leaf network device 1 determines whether to maintain connection 1 in an active state or to cause connection 1 to be in an inactive state based on determining the occurrence of the multihoming misconfiguration. For example, leaf network device 1 may determine to maintain connection 1 in an active state based on one or more conditions being satisfied. The one or more conditions may include leaf network device 1 being designated as a primary device, leaf network device 2 being designated as a secondary device, a device identifier included in the endpoint device 1 identification information being numerically smaller than a device identifier included in the endpoint device 2 identification information, the device identifier included in the endpoint device 1 identification information being numerically larger than the device identifier included in the endpoint device 2 identification information, a time at which a message including the endpoint device 1 identification information was received by leaf network device 1 being earlier than a time at which a message including the endpoint device 2 identification information was received by leaf network device 2, the time at which the message including the endpoint device 1 identification information was received by leaf network device 1 being later than the time at which a message including the endpoint device 2 identification information was received by leaf network device 2, that one or more maintenance criteria associated with connection 1 and/or connection 2 are satisfied, that one or more maintenance criteria associated with connection 1 and/or connection 2 are not satisfied, and/or the like. The conditions listed above are intended merely as examples of one or more conditions that may be used to determine whether to maintain connection 1 in an active state. In practice, any single condition listed above, any combination of conditions listed above, and/or one or more other conditions not listed above may be used.

As shown in FIG. 1F, and by reference number 136, leaf network device 1 determines that the one or more conditions are satisfied and maintains connection 1 in an active state based on the one or more conditions being satisfied. Leaf network device 1 may continue to transmit data to and/or from endpoint device 1 based on maintaining connection 1 in the active state. In some implementations, leaf network device 1 may transmit information indicating the occurrence of the multihoming misconfiguration and/or information indicating that connection 1 is being maintained in the active state to leaf network device 2.

As shown in FIG. 1F, and by reference number 138, leaf network device 2 determines an occurrence of a multihoming misconfiguration based on the endpoint device 1 information and the endpoint device 2 information. For example, leaf network device 2 may determine that the endpoint device 1 identification information does not correspond to the endpoint device 2 identification information. In some implementations, leaf network device 2 may determine the occurrence of the multihoming misconfiguration in a manner similar to that described above with respect to leaf network device 1 determining the occurrence of the multihoming misconfiguration.

In some implementations, leaf network device 2 determines whether to maintain connection 2 in an active state or to cause connection 2 to be in a standby or inactive state based on determining the occurrence of the multihoming misconfiguration. For example, leaf network device 2 may determine to cause connection 2 to be in an inactive state based on one or more conditions being satisfied. The one or more conditions may include leaf network device 1 being designated as a primary device, leaf network device 2 being designated as a secondary device, a device identifier included in the endpoint device 1 identification information being numerically smaller than a device identifier included in the endpoint device 2 identification information, the device identifier included in the endpoint device 1 identification information being numerically larger than the device identifier included in the endpoint device 2 identification information, a time at which a message including the endpoint device 1 identification information was received by leaf network device 1 being earlier than a time at which a message including the endpoint device 2 identification information was received by leaf network device 2, the time at which the message including the endpoint device 1 identification information was received by leaf network device 1 being later than the time at which a message including the endpoint device 2 identification information was received by leaf network device 2, that one or more maintenance criteria associated with connection 1 and/or connection 2 are satisfied, that one or more maintenance criterial associated with connection 1 and/or connection 2 are not satisfied, receiving information indicating an occurrence of a multihoming misconfiguration, and/or the like.

As shown in FIG. 1F, and by reference number 140, leaf network device 2 determines that the one or more conditions are satisfied and causes connection 2 to be in the inactive state based on the one or more conditions being satisfied. For example, leaf network device 2 may deactivate one or more interfaces associated with connection 2. In some implementations, when receiving data having a destination address associated with endpoint device 1, leaf network device 2 may forward the data to leaf network device 1, rather than incorrectly transmitting the data to endpoint device 2 via connection 2, based on connection 2 being in the inactive state. In this way, data can be prevented from being incorrectly routed to a wrong endpoint device when a multihoming misconfiguration occurs.

In some implementations, leaf network device 2 transmits a message, to endpoint device 2 and via connection 2, to cause at least one interface of endpoint device 2 that is associated with connection 2 to deactivate. Endpoint device 2 may deactivate one or more interfaces associated with connection 2 based on the message.

In some implementations, endpoint device 2 determines that connection 2 is in the inactive state and stores information in a data structure indicating that connection 2 is inactive and/or in the standby state. For example, endpoint device 2 may receive a message from leaf network device 2 indicating that connection 2 is to be transitioned to the inactive state based on leaf network device 2 determining the occurrence of the multihoming misconfiguration. Endpoint device 2 may store information in a routing table indicating that connection 2 is inactive, that connection 2 is in the inactive state, that data is not to be transmitted via connection 2 and/or a port associated with connection 2, and/or the like.

Alternatively, and/or additionally, endpoint device 2 may delete information from a data structure based on determining that connection 2 is in the inactive state. For example, endpoint device 2 may delete an entry indicating that endpoint device 2 is connected to leaf network device 2 via connection 2 from a routing table stored in a memory associated with endpoint device 2.

By causing connection 2 to change to the inactive state, the endpoint device 1 is connected to the leaf and spine network via a single active connection. In this way, an occurrence of a multihoming misconfiguration can be automatically determined by identifying an endpoint device having only a single active connection to the leaf and spine network. Identifying the occurrence of the multihoming misconfiguration may prevent traffic to and/or from the endpoint device from being misrouted thereby conserving computing resources that otherwise would have been used to receive and/or process misrouted traffic, to re-send traffic that is dropped based on being routed to the wrong endpoint device, and/or the like.

As indicated above, FIGS. 1A-1F are provided merely as one or more examples. Other examples may differ from what is described with regard to FIGS. 1A-1F. For example, although FIGS. 1A-1F are described in terms of a data center, implementations described herein may be practiced in different types of environments such as a service provider domain including a plurality of customer edge network devices connected to a one or more provider edge network devices.

Figure 2:
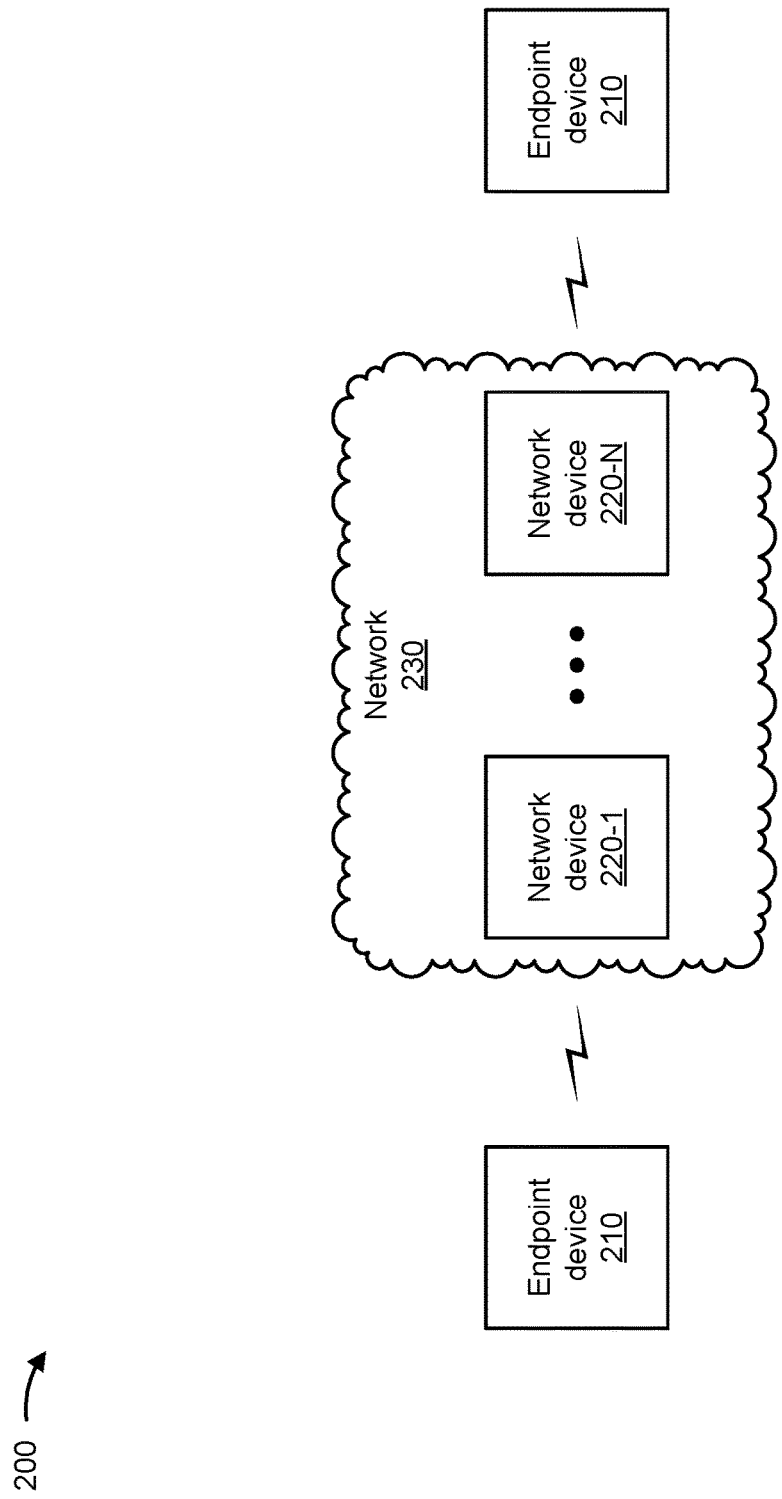
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include multiple endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a server, a firewall, an edge device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing network traffic in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230. As described herein, network devices 220 may be connected in a spine and leaf topology.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
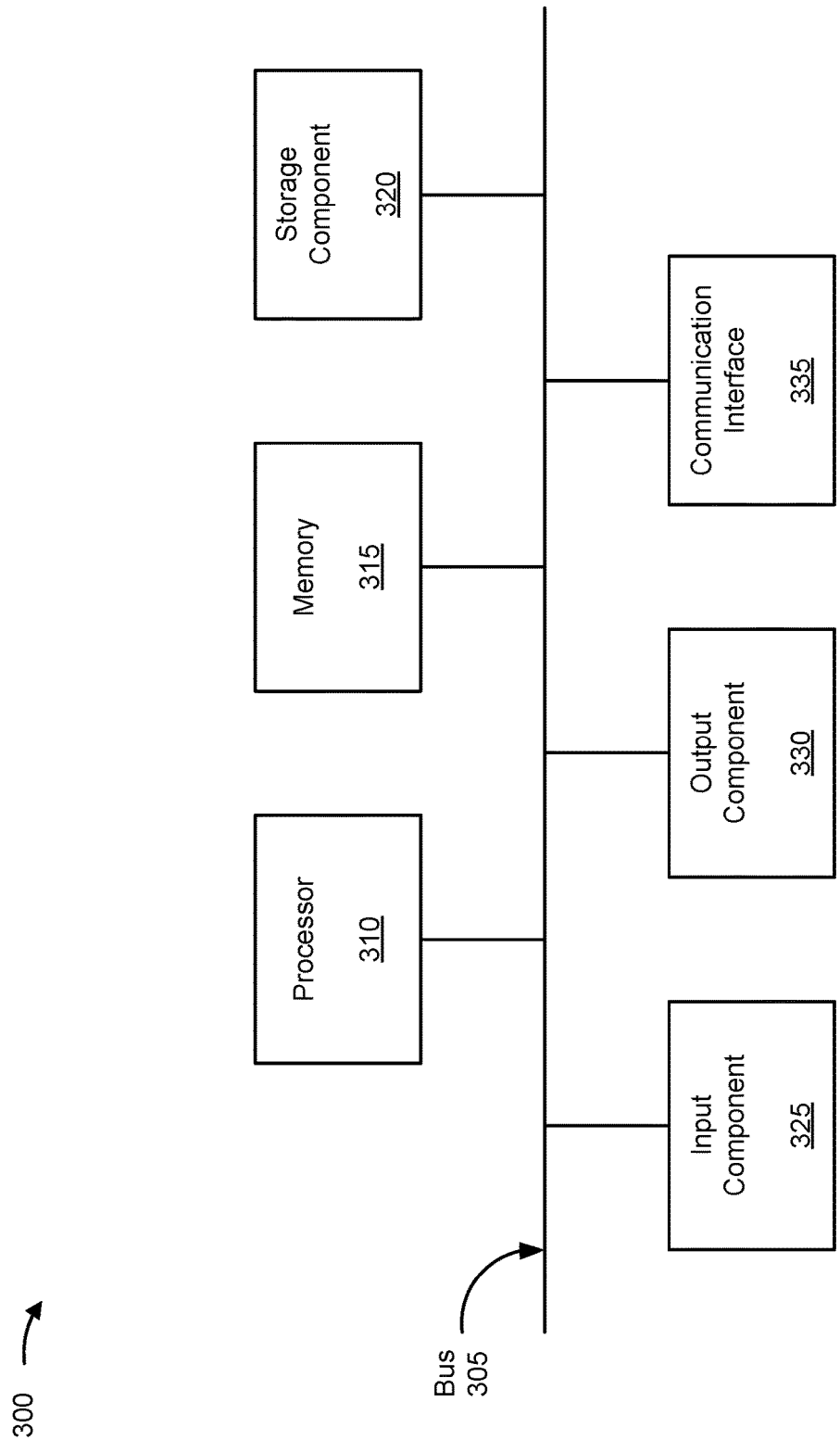
FIGS. 3A-3B are diagrams of example components of one or more devices of FIG. 2.
Figure 3B:
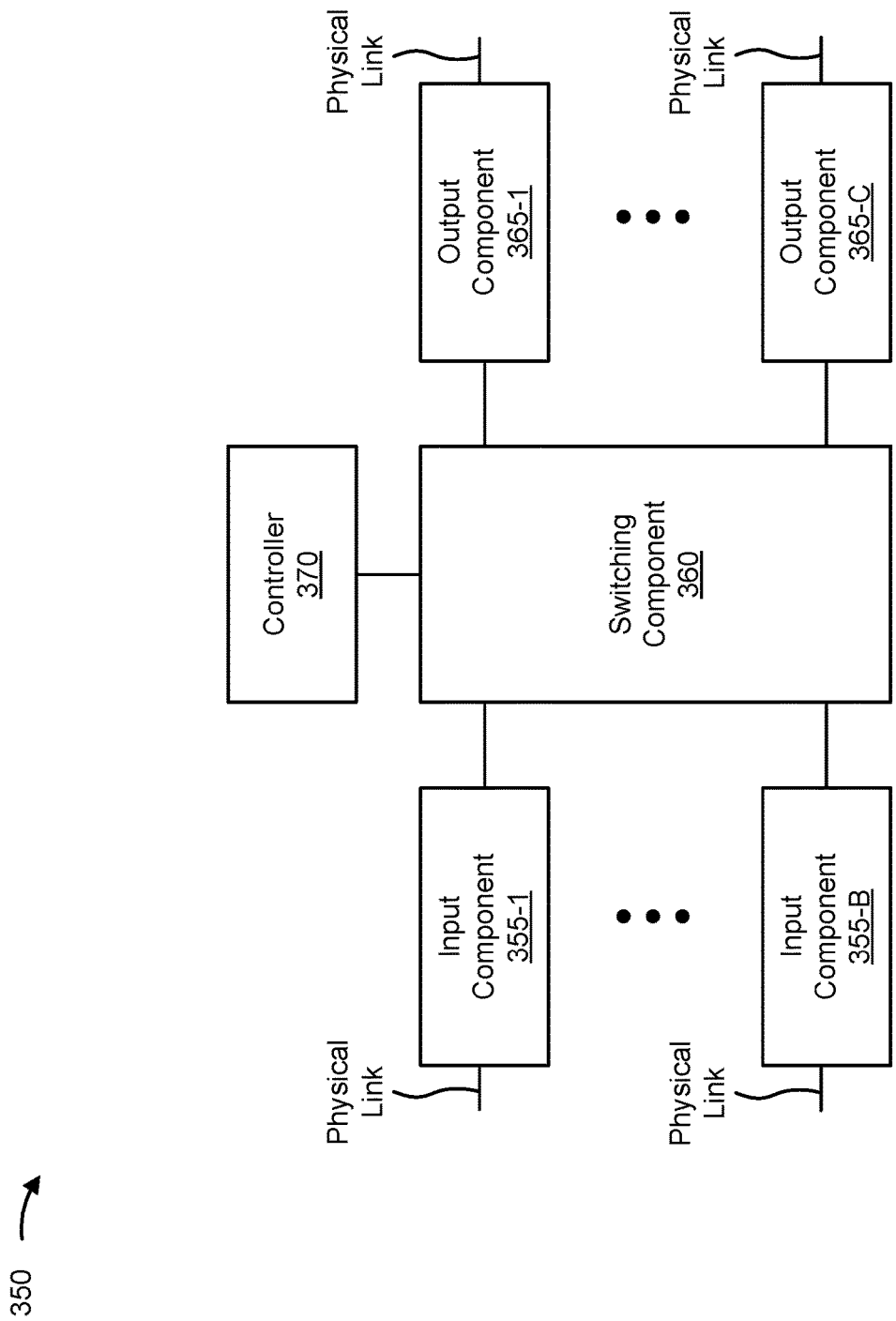

FIGS. 3A-3B are diagrams of example components of one or more devices of FIG. 2. FIG. 3A is a diagram of example components of a device 300. Device 300 may correspond to one or more of endpoint device 210 and/or network device 220. In some implementations, one or more of endpoint device 210 and/or network device 220 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to one or more of endpoint device 210 and/or network device 220. In some implementations, one or more of endpoint device 210 and/or network device 220 may include one or more devices 350 and/or one or more components of device 350. As shown in FIG. 3B, device 350 may include one or more input components 355-1 through 355-B (B>1) (hereinafter referred to collectively as input components 355, and individually as input component 355), a switching component 360, one or more output components 365-1 through 365-C (C>1) (hereinafter referred to collectively as output components 365, and individually as output component 365), and a controller 370.

Input components 355 may be points of attachment for physical tunnels and may be points of entry for incoming traffic, such as packets. Input component 355 may process incoming traffic, such as by performing data tunnel layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical tunnels. Output component 365 may support data tunnel layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
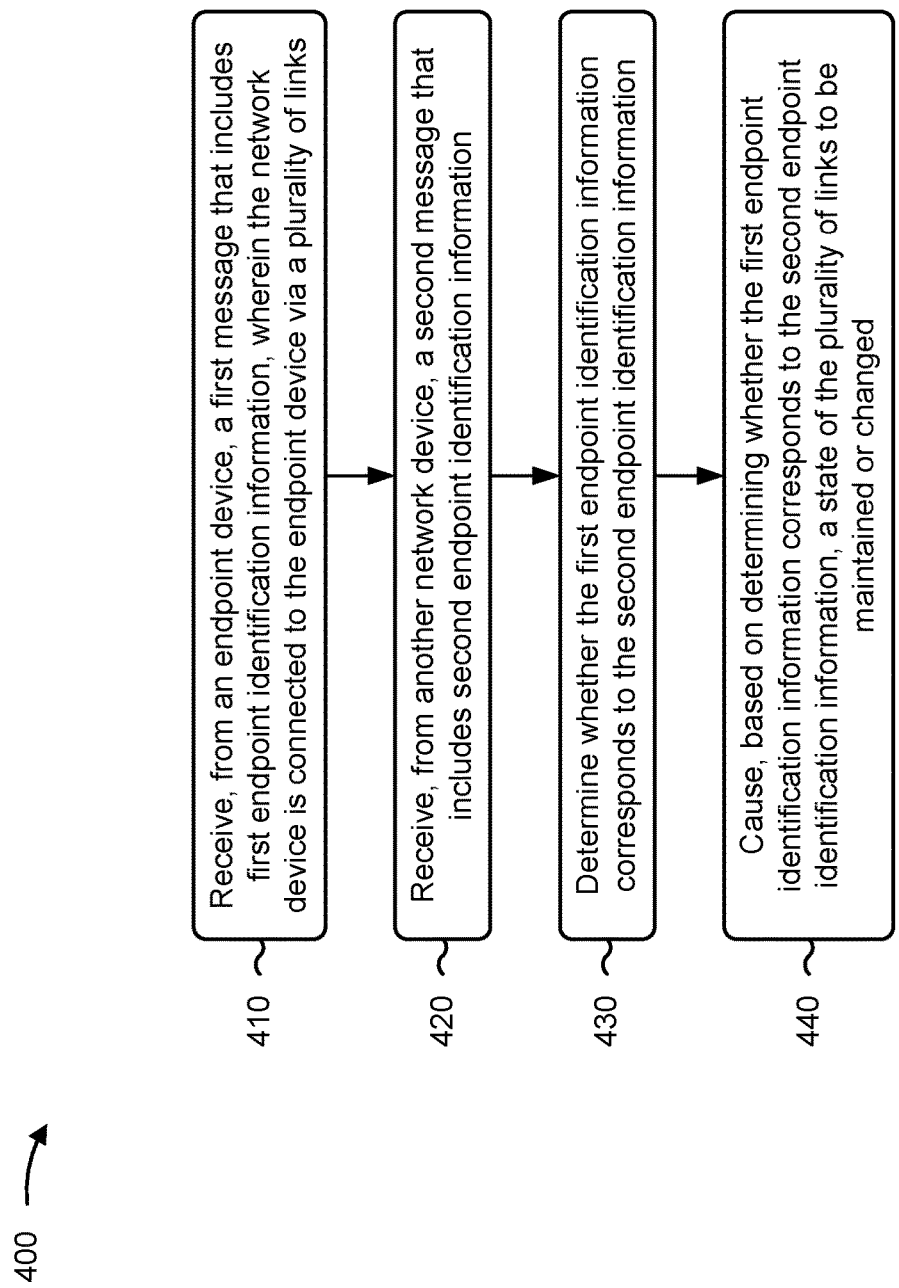

FIG. 4 is a flow chart of an example process 400 for detecting an occurrence of a multihoming misconfiguration. In some implementations, one or more process blocks of FIG. 4 may be performed by a network device (e.g., network device 220). In some implementations, one or more process blocks of FIG. 4 may be performed by another device or a group of devices separate from or including the network device, such as an endpoint device (e.g., endpoint device 210) and/or the like.

As shown in FIG. 4, process 400 may include receiving, from an endpoint device, a first message that includes first endpoint identification information, wherein the network device is connected to the endpoint device via a plurality of links (block 410). For example, the network device (e.g., using processor 310, memory 315, storage component 320, input component 325, output component 330, communication interface 335, input component 355, switching component 360, output components 365, controller 370, and/or the like) may receive, from an endpoint device, a first message that includes first endpoint identification information, as described above. In some implementations, the network device is connected to the endpoint device via a plurality of links.

As further shown in FIG. 4, process 400 may include receiving, from another network device, a second message that includes second endpoint identification information (block 420). For example, the network device (e.g., using processor 310, memory 315, storage component 320, input component 325, output component 330, communication interface 335, input component 355, switching component 360, output components 365, controller 370, and/or the like) may receive, from another network device, a second message that includes second endpoint identification information, as described above.

As further shown in FIG. 4, process 400 may include determining whether the first endpoint identification information corresponds to the second endpoint identification information (block 430). For example, the network device (e.g., using processor 310, memory 315, storage component 320, input component 325, output component 330, communication interface 335, input component 355, switching component 360, output components 365, controller 370, and/or the like) may determine whether the first endpoint identification information corresponds to the second endpoint identification information, as described above.

As further shown in FIG. 4, process 400 may include causing, based on determining whether the first endpoint identification information corresponds to the second endpoint identification information, a state of the plurality of links to be maintained or changed (block 440). For example, the network device (e.g., using processor 310, memory 315, storage component 320, input component 325, output component 330, communication interface 335, input component 355, switching component 360, output components 365, controller 370, and/or the like) may cause, based on determining whether the first endpoint identification information corresponds to the second endpoint identification information, a state of the plurality of links to be maintained or changed, as described above.

Process 400 may include additional implementations, such as any single implementation or any combination of implementations described below and/or in connection with one or more other processes described elsewhere herein.

In a first implementation, the network device and the other network device are leaf network devices in a spine and leaf network device architecture.

In a second implementation, alone or in combination with the first implementation, the first message comprises a link aggregation control protocol (LACP) protocol data unit (PDU) and the second message comprises a border gateway protocol (BGP) Ethernet virtual private network (EVPN) route.

In a third implementation, alone or in combination with one or more of the first and second implementations, determining whether the first endpoint identification information corresponds to the second endpoint identification information comprises: processing the first message to identify the first endpoint identification information; processing the second message to identify the second endpoint identification information, and comparing the first endpoint identification information and the second endpoint identification information to determine whether at least some of the first endpoint identification information matches at least some of the second endpoint identification information.

In a fourth implementation, alone or in combination with one or more of the first through third implementations, determining whether the first endpoint identification information corresponds to the second endpoint identification information comprises: processing the first message to identify the first endpoint identification information; processing the second message to identify the second endpoint identification information; causing a data structure to include a data structure element that indicates whether at least some of the first endpoint identification information and at least some of the second endpoint identification information match, and determining, based on the data structure element, whether the first endpoint identification information corresponds to the second endpoint identification information.

In a fifth implementation, alone or in combination with one or more of the first through fourth implementations, the state of the plurality of links is an active state and the network device determined that the first endpoint identification information corresponds to the second endpoint identification information, and causing the state of the plurality of links to be maintained or changed comprises: causing the active state of the plurality of links to be maintained.

In a sixth implementation, alone or in combination with one or more of the first through fifth implementations, causing the active state of the plurality of links to be maintained comprises: causing the network device to send one or more additional messages to the endpoint device via the plurality of links according to a first schedule; causing the endpoint device to send one or more additional messages to the network device via the plurality of links according to a second schedule; or adjusting a timeout interval associated with the plurality of links.

In a seventh implementation, alone or in combination with one or more of the first through sixth implementations, the state of the plurality of links is an active state and the network device determined that the first endpoint identification information does not correspond to the second endpoint identification information, and causing the state of the plurality of links to be maintained or changed comprises: processing the first endpoint identification information and the second endpoint identification information to determine that the endpoint device satisfies one or more maintenance criteria, and causing, based on determining that the endpoint device satisfies the one or more maintenance criteria, the active state of the plurality of links to be maintained.

In an eighth implementation, alone or in combination with one or more of the first through seventh implementations, the state of the plurality of links is an active state and the network device determined that the first endpoint identification information does not correspond to the second endpoint identification information, causing the state of the plurality of links to be maintained or changed comprises: processing the first endpoint identification information and the second endpoint identification information to determine that the endpoint device does not satisfy one or more maintenance criteria, and causing, based on determining that the endpoint device does not satisfy the one or more maintenance criteria, the state of the plurality of links to change to an inactive state.

In a ninth implementation, alone or in combination with one or more of the first through eighth implementations, causing the state of the plurality of links to change to the inactive state comprises: sending a message, via the plurality of links and to the endpoint device, to cause at least one interface of the endpoint device that is associated with the plurality of links to deactivate, and causing at least one interface of the network device that is associated with the plurality of links to deactivate.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for detecting an occurrence of a multihoming misconfiguration. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210, another network device (e.g., another network device 220), and/or the like.

As shown in FIG. 5, process 500 may include receiving, from an endpoint device and via a plurality of links that connect the network device and the endpoint device, a first message that includes first endpoint identification information (block 510). For example, the network device (e.g., using processor 310, memory 315, storage component 320, input component 325, output component 330, communication interface 335, input component 355, switching component 360, output components 365, controller 370, and/or the like) may receive, from an endpoint device and via a plurality of links that connect the network device and the endpoint device, a first message that includes first endpoint identification information, as described above.

As further shown in FIG. 5, process 500 may include receiving, from another network device, a second message that includes second endpoint identification information (block 520). For example, the network device (e.g., using processor 310, memory 315, storage component 320, input component 325, output component 330, communication interface 335, input component 355, switching component 360, output components 365, controller 370, and/or the like) may receive, from another network device, a second message that includes second endpoint identification information, as described above.

As further shown in FIG. 5, process 500 may include determining that at least some of the first endpoint identification information does not match at least some of the second endpoint identification information (block 530). For example, the network device (e.g., using processor 310, memory 315, storage component 320, input component 325, output component 330, communication interface 335, input component 355, switching component 360, output components 365, controller 370, and/or the like) may determine that at least some of the first endpoint identification information does not match at least some of the second endpoint identification information, as described above.

As further shown in FIG. 5, process 500 may include causing, based on determining that the at least some of the first endpoint identification information does not match the at least some of the second endpoint identification information, a state of the plurality of links to be maintained as an active state or changed to an inactive state (block 540). For example, the network device (e.g., using processor 310, memory 315, storage component 320, input component 325, output component 330, communication interface 335, input component 355, switching component 360, output components 365, controller 370, and/or the like) may cause, based on determining that the at least some of the first endpoint identification information does not match the at least some of the second endpoint identification information, a state of the plurality of links to be maintained as an active state or changed to an inactive state, as described above.

Process 500 may include additional implementations, such as any single implementation or any combination of implementations described below and/or in connection with one or more other processes described elsewhere herein.

In a first implementation, receiving the second message that includes the second endpoint identification information includes receiving, via at least one link that connects the network device and the other network device, the second message; or receiving, via at least one link that connects the network device and a different network device, wherein the different network device is being directly or indirectly connected to the other network device.

In a second implementation, alone or in combination with the first implementation, the network device and the other network device are associated with the same Ethernet segment identifier (ESI).

In a third implementation, alone or in combination with one or more of the first and second implementations, the first message is a link aggregation control protocol (LACP) protocol data unit (PDU) and the second message comprises an Ethernet segment route.

In a fourth implementation, alone or in combination with one or more of the first through third implementations, determining that the at least some of the first endpoint identification information does not match the at least some of the second endpoint identification information includes processing the first endpoint identification information to determine an identifier associated with the endpoint device; processing the second endpoint identification information to determine an identifier associated with another endpoint device; and determining, based on the identifier associated with the endpoint device and the identifier associated with the other endpoint device, that the at least some of the first endpoint identification information does not match the at least some of the second endpoint identification information.

In a fifth implementation, alone or in combination with one or more of the first through fourth implementations, causing the state of the plurality of links to be maintained or changed includes determining a time at which the first message was received; determining a time at which the second message was received; determining, based on the time at which the first message was received and the time at which the second message was received, that the network device received the first message before the second message; and causing, based on determining that the network device received the first message before the second message, the state of the plurality of links to be maintained as the active state.

In a sixth implementation, alone or in combination with one or more of the first through fifth implementations, causing the state of the plurality of links to be maintained or changed includes determining that the network device received the second message before the first message; and causing, based on determining that the network device received the second message before the first message, the state of the plurality of links be changed to the inactive state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for detecting an occurrence of a multihoming misconfiguration. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210, another network device (e.g., another network device 220), and/or the like.

As shown in FIG. 6, process 600 may include receiving, from an endpoint device and via a plurality of links that connect the network device and the endpoint device, a first message that includes first endpoint identification information (block 610). For example, the network device (e.g., using processor 310, memory 315, storage component 320, input component 325, output component 330, communication interface 335, input component 355, switching component 360, output components 365, controller 370, and/or the like) may receive, from an endpoint device and via a plurality of links that connect the network device and the endpoint device, a first message that includes first endpoint identification information, as described above.

As further shown in FIG. 6, process 600 may include receiving, from another network device, a second message that includes second endpoint identification information (block 620). For example, the network device (e.g., using processor 310, memory 315, storage component 320, input component 325, output component 330, communication interface 335, input component 355, switching component 360, output components 365, controller 370, and/or the like) may receive, from another network device, a second message that includes second endpoint identification information, as described above.

As further shown in FIG. 6, process 600 may include determining that at least some of the first endpoint identification information matches at least some of the second endpoint identification information (block 630). For example, the network device (e.g., using processor 310, memory 315, storage component 320, input component 325, output component 330, communication interface 335, input component 355, switching component 360, output components 365, controller 370, and/or the like) may determine that at least some of the first endpoint identification information matches at least some of the second endpoint identification information, as described above.

As further shown in FIG. 6, process 600 may include causing, based on determining that the at least some of the first endpoint identification information matches the at least some of the second endpoint identification information, a state of the plurality of links to be maintained as an active state (block 640). For example, the network device (e.g., using processor 310, memory 315, storage component 320, input component 325, output component 330, communication interface 335, input component 355, switching component 360, output components 365, controller 370, and/or the like) may cause, based on determining that the at least some of the first endpoint identification information matches the at least some of the second endpoint identification information, a state of the plurality of links to be maintained as an active state, as described above.

Process 600 may include additional implementations, such as any single implementation or any combination of implementations described below and/or in connection with one or more other processes described elsewhere herein.

In a first implementation, determining that the at least some of the first endpoint identification information matches the at least some of the second endpoint identification information includes determining that the first endpoint identification information and the second endpoint identification information respectively include an identifier associated with the endpoint device; and determining, based on determining that the first endpoint identification information and the second endpoint identification information respectively include the identifier associated with the endpoint device, that the at least some of the first endpoint identification information matches the at least some of the second endpoint identification information.

In a second implementation, alone or in combination with the first implementation, the plurality of links that connect the network device and the endpoint device comprise a link aggregation group (LAG), and the network device is connected to the other network device via at least one Ethernet virtual private network (EVPN) link.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term network traffic includes a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device and from an endpoint device, a first message that includes first endpoint identification information,
      wherein the network device is connected to the endpoint device via a plurality of links;
   determining, by the network device and based on receiving the first message, that the network device and another network device are associated with same network device identification information;
   receiving, by the network device and based on determining that the network device and the other network device are associated with the same network device identification information, a second message that includes second endpoint identification information;
   determining, by the network device, whether the first endpoint identification information corresponds to the second endpoint identification information; and
   causing, by the network device and based on determining whether the first endpoint identification information corresponds to the second endpoint identification information, a state of the plurality of links to be maintained or changed.

2. The method of claim 1, wherein the network device and the other network device are leaf network devices in a spine and leaf network device architecture.

3. The method of claim 1, wherein the first message comprises a link aggregation control protocol protocol data unit and the second message comprises a border gateway protocol Ethernet virtual private network route.

4. The method of claim 1, wherein determining whether the first endpoint identification information corresponds to the second endpoint identification information comprises:
   processing the first message to identify the first endpoint identification information;
   processing the second message to identify the second endpoint identification information; and
   comparing the first endpoint identification information and the second endpoint identification information to determine whether at least some of the first endpoint identification information matches at least some of the second endpoint identification information.

5. The method of claim 1, wherein determining whether the first endpoint identification information corresponds to the second endpoint identification information comprises:
   processing the first message to identify the first endpoint identification information;
   processing the second message to identify the second endpoint identification information;
   causing a data structure to include a data structure element that indicates whether at least some of the first endpoint identification information and at least some of the second endpoint identification information match; and determining, based on the data structure element, whether the first endpoint identification information corresponds to the second endpoint identification information.

6. The method of claim 1, wherein the state of the plurality of links is an active state and the network device determined that the first endpoint identification information corresponds to the second endpoint identification information, wherein causing the state of the plurality of links to be maintained or changed comprises:

causing the active state of the plurality of links to be maintained.

7. The method of claim 6, wherein causing the active state of the plurality of links to be maintained comprises:

causing the network device to send a third message to the endpoint device via the plurality of links according to a first schedule;

causing the endpoint device to send a fourth message to the network device via the plurality of links according to a second schedule; or adjusting a timeout interval associated with the plurality of links.

8. The method of claim 1, wherein the state of the plurality of links is an active state and the network device determined that the first endpoint identification information does not correspond to the second endpoint identification information, wherein causing the state of the plurality of links to be maintained or changed comprises:

processing the first endpoint identification information and the second endpoint identification information to determine that the endpoint device satisfies one or more maintenance criteria; and causing, based on determining that the endpoint device satisfies the one or more maintenance criteria, the active state of the plurality of links to be maintained.

9. The method of claim 1, wherein the state of the plurality of links is an active state and the network device determined that the first endpoint identification information does not correspond to the second endpoint identification information, wherein causing the state of the plurality of links to be maintained or changed comprises:

processing the first endpoint identification information and the second endpoint identification information to determine that the endpoint device does not satisfy one or more maintenance criteria; and causing, based on determining that the endpoint device does not satisfy the one or more maintenance criteria, the state of the plurality of links to change to an inactive state.

10. The method of claim 9, wherein causing the state of the plurality of links to change to the inactive state comprises:

sending a third message, via the plurality of links and to the endpoint device, to cause at least one interface of the endpoint device that is associated with the plurality of links to deactivate; and causing at least one interface of the network device that is associated with the plurality of links to deactivate.

11. A network device, comprising:
one or more memories; and
one or more processors to:

receive, from an endpoint device and via a plurality of links that connect the network device and the endpoint device, a first message that includes first endpoint identification information, determine, based on receiving the first message, that the network device and another network device are associated with a same network device identification information, receive, based on determining that the network device and the other network device are associated with the same network device identification information, a second message that includes second endpoint identification information;

determine that at least some of the first endpoint identification information does not match at least some of the second endpoint identification information; and cause, based on determining that the at least some of the first endpoint identification information does not match the at least some of the second endpoint identification information, a state of the plurality of links to be maintained as an active state or changed to an inactive state.

12. The network device of claim 11, wherein the one or more processors, when receiving the second message that includes the second endpoint identification information, are to:

receive, via at least one link that connects the network device and the other network device, the second message; or receive, via at least one link that connects the network device and a different network device, wherein the different network device is directly or indirectly connected to the other network device.

13. The network device of claim 11, wherein the network device and the other network device are associated with the same Ethernet segment identifier (ESI).

14. The network device of claim 11, wherein the first message is a link aggregation control protocol data unit and the second message comprises an Ethernet segment route.

15. The network device of claim 11, wherein the one or more processors, when determining that the at least some of the first endpoint identification information does not match the at least some of the second endpoint identification information, are to:

process the first endpoint identification information to determine an identifier associated with the endpoint device;

process the second endpoint identification information to determine an identifier associated with another endpoint device; and determine, based on the identifier associated with the endpoint device and the identifier associated with the other endpoint device, that the at least some of the first endpoint identification information does not match the at least some of the second endpoint identification information.

16. The network device of claim 11, wherein the one or more processors, when causing the state of the plurality of links to be maintained or changed, are to:

determine a time at which the first message was received;
determine a second time at which the second message was received;
determine, based on the time at which the first message was received and the second time at which the second message was received, that the network device received the first message before the second message; and cause, based on determining that the network device received the first message before the second message, the state of the plurality of links to be maintained as the active state.

17. The network device of claim 11, wherein the one or more processors, when causing the state of the plurality of links to be maintained or changed, are to:

determine that the network device received the second message before the first message; and cause, based on determining that the network device received the second message before the first message, the state of the plurality of links be changed to the inactive state.

18. A non-transitory computer-readable medium storing instructions, the instructions comprising:

one or more instructions that, when executed by one or more processors of a network device, cause the one or more processors to:

receive, from an endpoint device and via a plurality of links that connect the network device and the endpoint device, a first message that includes first endpoint identification information;

determine, based on receiving the first message, that the network device and another network device are associated with a same network device identification information;

receive, based on determining that the network device and the other network device are associated with the same network device identification information, a second message that includes second endpoint identification information;

determine that at least some of the first endpoint identification information matches at least some of the second endpoint identification information; and cause, based on determining that the at least some of the first endpoint identification information matches the at least some of the second endpoint identification information, a state of the plurality of links to be maintained as an active state.

19. The non-transitory computer-readable medium of claim 18, wherein the one or more instructions, that cause the one or more processors to determine that the at least some of the first endpoint identification information matches the at least some of the second endpoint identification information, cause the one or more processors to:

determine that the first endpoint identification information and the second endpoint identification information respectively include an identifier associated with the endpoint device; and determine, based on determining that the first endpoint identification information and the second endpoint identification information respectively include the identifier associated with the endpoint device, that the at least some of the first endpoint identification information matches the at least some of the second endpoint identification information.

20. The non-transitory computer-readable medium of claim 18, wherein the plurality of links that connect the network device and the endpoint device comprise a link aggregation group, and wherein the network device is connected to the other network device via at least one Ethernet virtual private network link.

* * * * *